(12) United States Patent
Gallatin

(10) Patent No.: US 9,535,850 B1
(45) Date of Patent: Jan. 3, 2017

(54) SYSTEM AND METHOD FOR EFFICIENT DMA TRANSFERS

(71) Applicant: Google Inc., Mountain View, CA (US)

(72) Inventor: Andrew Gallatin, Mountain View, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/607,582

(22) Filed: Jan. 28, 2015

(51) Int. Cl.
  *G06F 12/1081* (2016.01)
  *G06F 13/28* (2006.01)
  *G06F 12/10* (2016.01)

(52) U.S. Cl.
  CPC .......... *G06F 12/1081* (2013.01); *G06F 13/28* (2013.01)

(58) Field of Classification Search
  None
  See application file for complete search history.

(56) References Cited

U.S. PATENT DOCUMENTS

| 5,590,378 A | 12/1996 | Thayer et al. |
| 5,812,876 A | 9/1998 | Welker et al. |
| 6,693,946 B2 | 2/2004 | Wilson et al. |
| 7,640,377 B2 | 12/2009 | Matsuda et al. |
| 7,689,738 B1 | 3/2010 | Williams et al. |
| 2007/0079073 A1* | 4/2007 | Rosenbluth ......... G06F 9/30047 711/134 |
| 2009/0006932 A1* | 1/2009 | Biran .................. G06F 13/4282 714/807 |
| 2012/0284466 A1 | 11/2012 | Galbo et al. |

* cited by examiner

*Primary Examiner* — Zachary K Huson
*Assistant Examiner* — Dayton Lewis-Taylor
(74) *Attorney, Agent, or Firm* — Lerner, David, Littenberg, Krumholz & Mentlik, LLP

(57) ABSTRACT

A method and apparatus are provided in which a host device and a peripheral device are adapted to perform efficient data transfers. The host receives one or more bytes in a memory transfer from the peripheral device, and determines an operation for modifying the memory transfer without reading the one or more bytes. Rather, the modification may be performed based on information in a header accompanying the transferred bytes. The host device modifies the memory transfer based on the determination, and writes the modified memory transfer to memory.

18 Claims, 5 Drawing Sheets

SYSTEM AND METHOD FOR EFFICIENT DMA TRANSFERS

BACKGROUND

Before an Ethernet network interface controller (NIC) receives a packet, the host has pre-allocated a fixed size memory buffer for the NIC to transfer the packet into. After the packet arrives at the NIC, the NIC transfers the packet to host memory via a direct memory access (DMA) write. The host computer looks only at the packet data written by the NIC, and ignores the state of memory outside the packet in its receive buffers.

Host memory systems must by written to in units of a cacheline size, typically 64 or 128 bytes. To write a smaller value to memory, a host must read the cacheline, modify the data, and write it back to memory. This is called read-modify-write operation.

When a peripheral device, such as a peripheral component interface express (PCIe) based NIC, performs a DMA write to a host computer system and the DMA transfer is to an address which is not aligned on a cacheline boundary, or the DMA transfer is not a multiple of the cacheline size in length, the host system must perform a read-modify-write cycle where it first reads the cacheline surrounding the modified data, and modifies the cacheline to include the DMA transfer, and then writes the modified cacheline back to memory. This read-modify-write cycle is wasteful of host memory bandwidth, and can itself become a bottleneck preventing a device from working at full speed, since the host system is using twice as much memory bandwidth as would otherwise be required.

If a NIC wishes to avoid these read-modify-write operations on the host, it must pad received frames so that they are a multiple of cacheline size in length and start aligned on a cacheline boundary. This wastes PCIe bandwidth, as the device may be forced to send nearly 49% of its traffic as padding, in the worst case (65 byte packets padded to 128 bytes to accommodate a host with a 64 byte cacheline size).

SUMMARY

One aspect of the disclosure provides a method of processing memory transfers, comprising receiving, at a host device, one or more bytes in a memory transfer, such as a DMA transfer, from a peripheral device. The method further includes determining, by the host device, an operation for modifying the memory transfer without reading the one or more bytes, modifying, by the host device, the memory transfer based on the determination, and writing, by the host device, the modified memory transfer to memory. Modifying the memory transfer may include adjusting a number of bytes in the memory transfer, such as by padding the one or more bytes with additional bytes. The number of the additional bytes for padding the one or more bytes of the memory transfer may be determined by the host device using internal logic. The modification may be determined based on information in the memory transfer, such as a flag set in a transaction layer packet header accompanying the one or more bytes.

Another aspect of the disclosure provides a system for processing memory transfers, comprising at least one memory for storing received data, the memory being subdivided into cachelines of a predetermined length, and one or more processors in communication with the memory. The one or more processor are programmed to receive one or more bytes in a memory transfer from a peripheral device, determine an operation for modifying the memory transfer without reading the one or more bytes, modify the memory transfer based on the determination, and write the modified memory transfer to the at least one memory.

Yet another aspect of the disclosure provides a system for facilitating memory transfers, comprising one or more processors, and at least one memory in communication with the one or more processors. The at least one memory stores instructions executable by the one or more processors to identify bits to transfer to another computing device, determine, based on the identified bits, a modification required by the another computing device, and indicate the determined modification to the another computing device while transferring the identified bits to the another computing device. Indicating the determined modification may comprise setting one or more bits in a header accompanying the identified bits. The indication is adapted to be understood by the another computing device without requiring the another computing device to perform a read of the identified bits. The determined modification may be a padding of the identified bits.

DETAILED DESCRIPTION

Overview

The present disclosure provides a system and method for improving efficiency in direct memory access (DMA) transfers. When a DMA transfer is performed between a PCIe device, such as a Network Interface Controller (NIC), and a host, the host typically must perform a read-modify-write operation to ensure that a received cacheline of the transfer is the right length and is properly aligned with chunks of host memory. However, as described herein, a PCIe device informs the host that it can write to the cacheline without first performing a read.

The host can write without regard to contents of the cacheline surrounding the actual bytes that it is writing in the DMA transfer. For example, the host may, in response to a signal from the PCIe device, overwrite bytes inside the cacheline, but outside the bytes specified in the DMA transfer. The host chipset reads a cacheline sized block of zeroed memory from a fast internal logic rather than from host memory, and combines the DMA write with this local memory, and then writes the full cacheline to host memory. In other words, the host supplies padding bytes to the DMA bytes, and then writes them to host memory. The padding bytes are supplied by logic, rather than by memory. While in some examples the padding may be zeroes, in other examples it could be any data that was close to the host chipset, and which did not need to be read from host memory. Since the host kernel does not pass memory outside the packet to applications, any value may be used for the padding.

One example of a signal from the PCIe device to the host that it need not preserve the remainder of the cacheline is a flag set in the PCIe device header. For example, a high-order steering tag bit is set in the PCIe Memory Write (MWr) transaction layer packet (TLP) header. However, any mechanism agreed upon by the PCIe device and the host can be used to signal to the host that the read operation need not be performed.

By asking the host chipset to supply the padding bytes, the padding is removed from the DMA transfer, and PCIe bandwidth is conserved as well as host memory bandwidth. In addition, the host avoids an expensive read-modify-write operation by writing the DMA'd bytes to memory after padding them. This reduces the host system memory load by nearly a factor of two.

Example Systems

Figure 1:
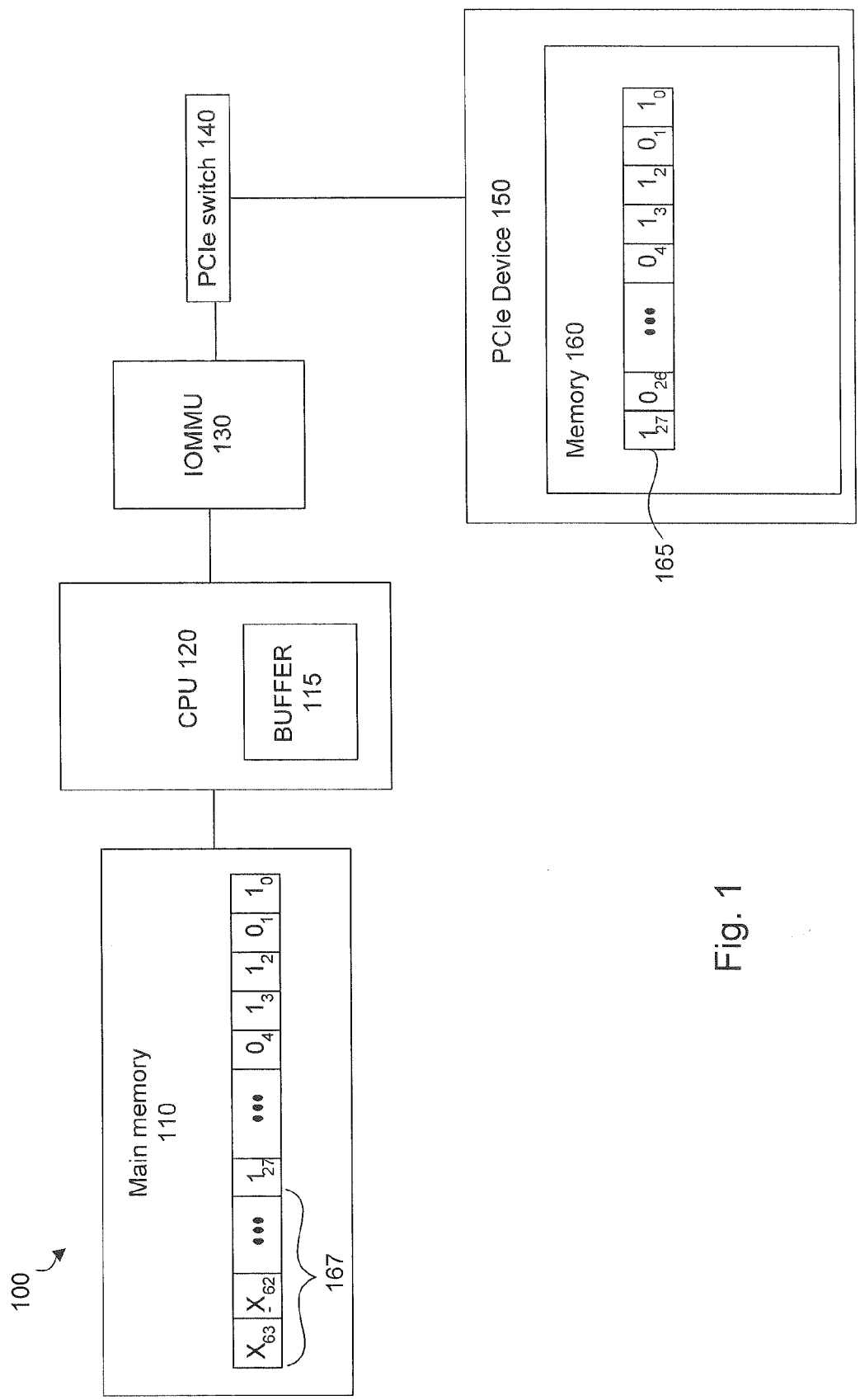
FIG. 1 is an example system according to aspects of the disclosure.

FIG. 1 illustrates an example computing system 100. The computing system 100 may be, for example, a system of computing devices interconnected on a motherboard. Such a network may be present in datacenters or other computing environments. The computer system 100 includes main memory 110 coupled to one or more host central processing units (CPU) 120. The host CPUs 120 are further coupled to an input/output memory management unit (IOMMU) 130, such as Virtualization Technology for Directed I/O (VT-d) device. The IOMMU 130 and PCIe device 150 are connected via a PCIe switch 140.

The host CPU 120 includes buffer 115, which temporarily stores data prior to writing the data to the main memory 110. For example, a DMA transfer received at the host 120 from peripheral device 150 may be temporarily stored in the buffer 115 while it is padded or offset by the host 120 to be cacheline sized and cacheline aligned with other data in the memory 110. The modified transfer may then be written to the main memory 110.

The main memory 110 is accessible by the host CPU 120, and may store data and instructions executable by the host CPU 120. The host CPU 120 may write to the main memory 110 upon receipt of bytes of a DMA transfer from the PCIe device 150. For example, the PCIe device 150 may send a number of bits 165. According to some examples, the PCIe device 150 may include with the transmission an indicator of how the host CPU 120 should handle the bits 165. For example, upon receipt of the bits 154, the host CPU 120 may determine, without reading the bits 165, that the bits need to be padded prior to writing to memory 110 to ensure proper cache alignment. The determination may be made for each separate transmission based on the indicator provided by the PCIe device 150. As shown in FIG. 1, the host CPU 120 pads the bits 165 with a number of additional bits and then writes them to memory 110.

The CPU core 120 is connected to and communicates with the main memory 110 by, for example, a data bus and an address bus. The main memory 110 may be any type of memory, such as random access memory, removable storage media, cache, registers, or the like. The CPU core 120 may be a microprocessor residing on a chip, a multi-core processor, or any other known processor. While only one CPU core is shown, any number of CPU cores may be connected between the main memory 110 and the IOMMU 130. The CPU 120 further includes memory 180, which may be used, by way of example only, for storing logic used for handling DMA transfers from the PCIe device 150.

The IOMMU 130 connects DMA-capable devices to the main memory 110. The PCIe switch 140 is a high speed interconnect providing for interconnection of one or more system devices, such as the PCIe device 150, to other components in the computer system 100. The PCIe switch 140 may be a motherboard-level interconnect, an expansion card interface, or the like. The system devices may communicate through the PCIe switch 140 over one or more links.

The PCIe device 150 includes memory 160, which includes data and instructions. For example, the instructions 164 are executable by one or more processors to identify required modifications to bytes identified for DMA transfer, and indicate to the host 120 the required modifications. The memory 160 and processor are described in further detail below in connection with FIG. 3. The PCIe device may be any of a variety of system devices, including system devices that have been customized. For example, the PCIe device 150 may be a customized NIC, solid state drive (SSD), field programmable gate array (FPGA), application specific integrated circuit (ASIC), graphics processing unit (GPU), or the like.

While the computer system 100 has been described above as a system of devices on a motherboard, it should be understood that the computer system 100 may be any configuration of electronically coupled computing devices. For example, the network may include a backplane interconnecting peripherals, an expansion card interface, or the like. As another example, the connection between the computing devices may be hard-wired connections, wireless connections, or any other type of connections. As yet another example, the computer system 100 may include TCP/IP, 802.33, Ethernet, InfiniBand, or any other type of network.

Figure 2:
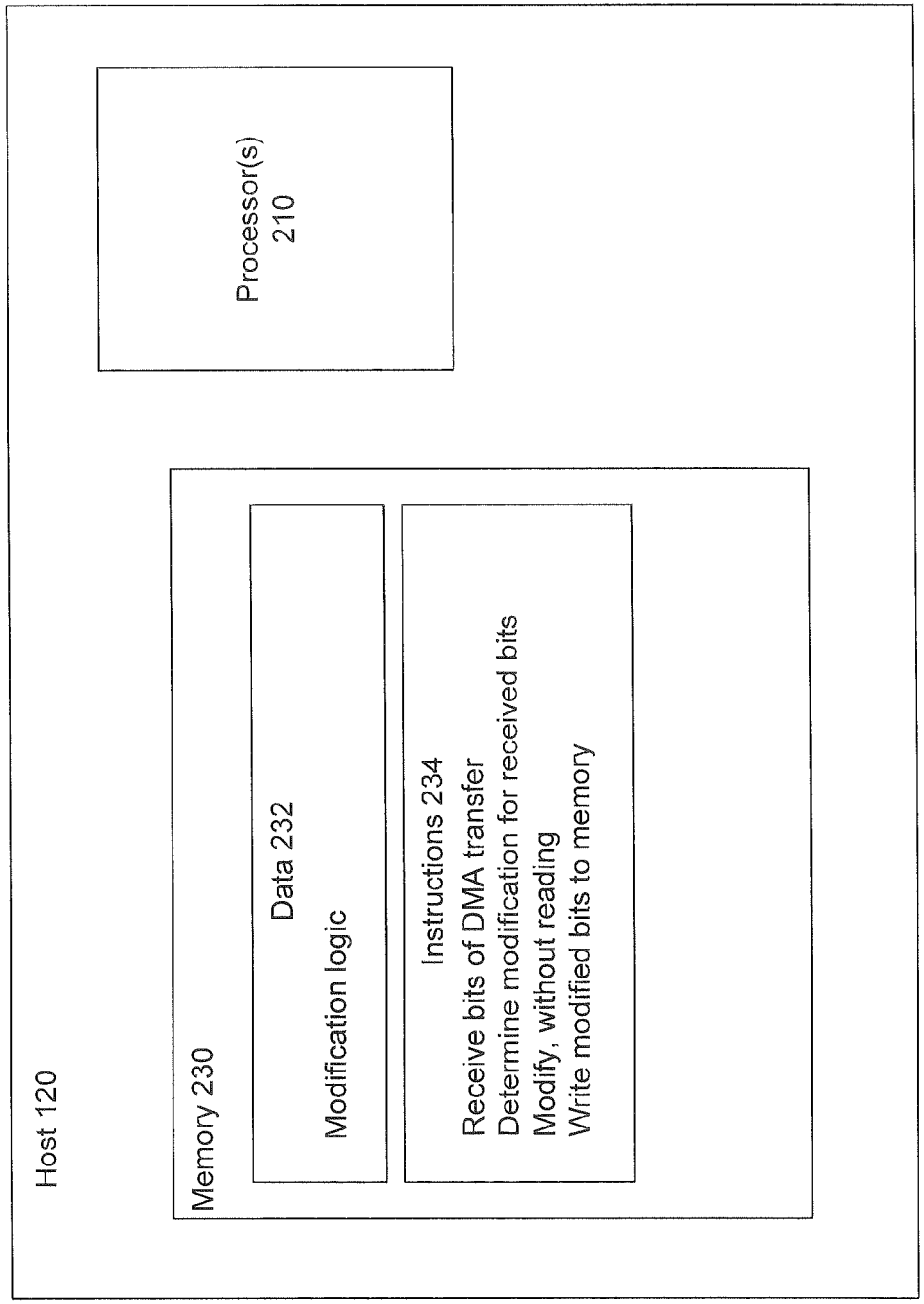
FIG. 2 is a block diagram of components of the system of FIG. 1 according to aspects of the disclosure.

FIG. 2 provides a more detailed example of the host CPU 120. The host CPU 120 includes memory 240 and one or more processors 210. The memory 230 includes data 232 and instructions 234, which are executable by the processors 210.

The processor 210 may be any well-known processor, such as a commercially available CPU or microcontroller. Alternatively, the processor may be a dedicated controller such as an ASIC. According to another example, the processor may be a state machine.

Memory 230 stores information accessible by processor 210, including instructions 234 that may be executed by the processor 210. The memory may be of any type capable of storing information accessible by the processor, such as a hard-drive, memory card, ROM, RAM, DVD, CD-ROM, write-capable, and read-only memories. The memory 230 includes data 232 that may be retrieved, manipulated or stored by the processor in accordance with the instructions 234. For instance, although the system and method is not limited by any particular data structure, the data may be stored in computer registers, in a relational database as a table having a plurality of different fields and records, or XML documents. The data may also be formatted in any computer-readable format such as, but not limited to, binary values, ASCII or Unicode. Moreover, the data may comprise any information sufficient to identify the relevant information, such as numbers, descriptive text, proprietary codes, pointers, references to data stored in other memories (including other network locations) or information that is used by a function to calculate the relevant data.

The instructions 234 may be any set of instructions to be executed directly (such as machine code) or indirectly (such as scripts) by the processor. In that regard, the terms "instructions," "steps" and "programs" may be used interchangeably herein. The instructions may be stored in object code format for direct processing by the processor, or in any other computer language including scripts or collections of independent source code modules that are interpreted on demand or compiled in advance.

The instructions 234 may be executed by the processor 210, for example, to handle data transfers from a connected peripheral device. In particular, the instructions 234 may provide for determining whether to modify the data without performing a read operation. The instructions 234 may further provide for modifying the data based on the determination, and writing the modified data to memory. Examples of modification include padding the transferred bits to ensure proper cacheline size and alignment. The transferred bits may be padded with zeros or any other value. According to one example, the padding could be any data that was close to the host chipset, and which did not need to be read from host memory. Since the host kernel does not pass memory outside the packet to applications, the value of the padding does not matter.

According to some examples, data 232 may include logic used for modifying the received memory transfers. For example, the logic may modify one or both of the length of the transfer and an offset of the transfer in order to make the transfer cacheline sized and cacheline aligned.

Although FIG. 2 functionally illustrates the processor 210 and memory 230 as being within the same block, it will be understood that the processor and memory may actually comprise multiple processors and memories that may or may not be stored within the same physical housing. For example, some of the instructions and data may be stored on removable CD-ROM and others within a read-only computer chip. Some or all of the instructions and data may be stored in a location physically remote from, yet still accessible by, the processor 120. Similarly, the processor 120 may actually comprise a collection of processors which may or may not operate in parallel.

Figure 3:
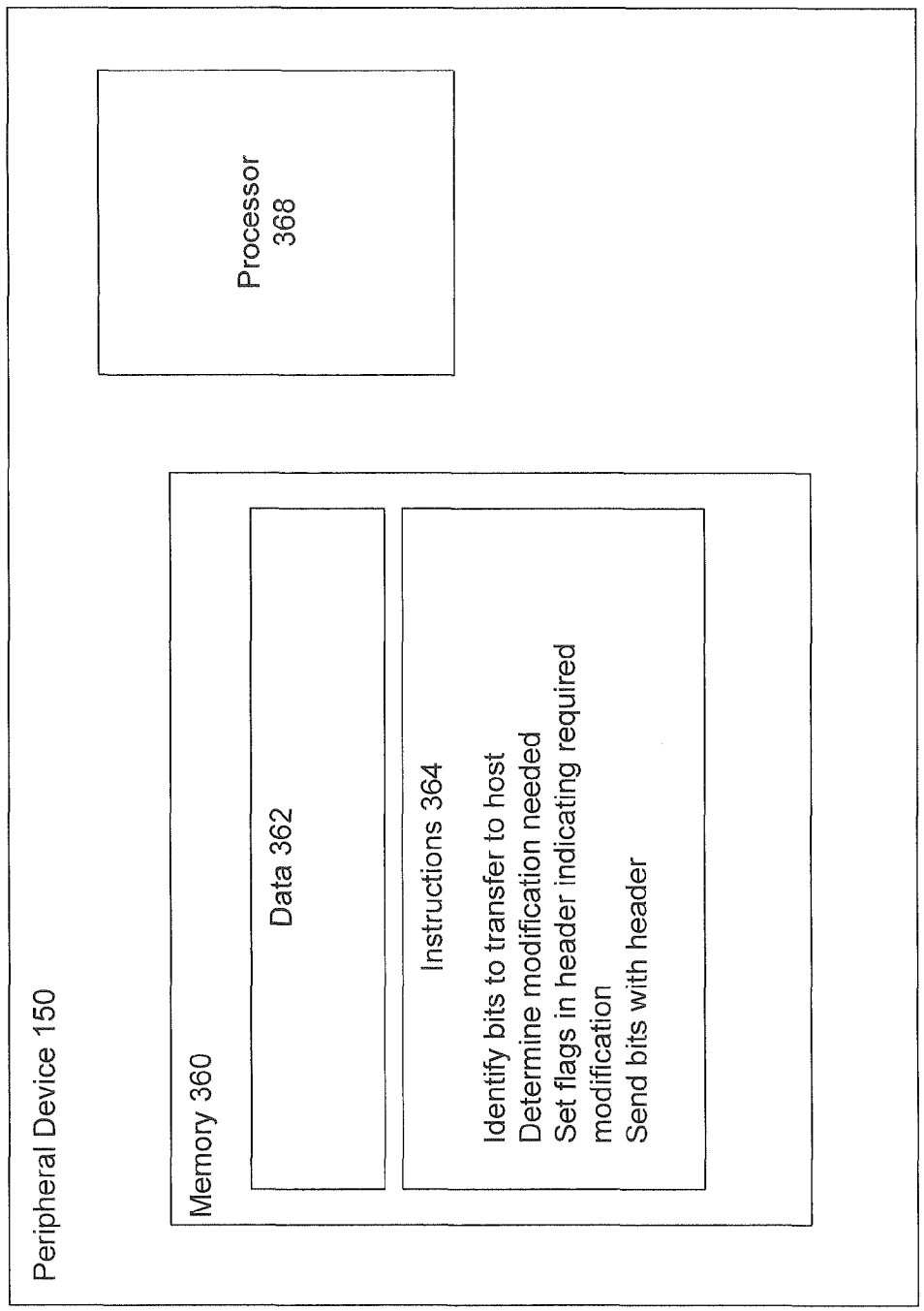
FIG. 3 is another block diagram of components of the system of FIG. 1 according to aspects of the disclosure.

FIG. 3 provides a detailed example of peripheral device 150. As shown, peripheral device 150 includes data 362 and instructions 364 in its memory 360, and one or more processors 368 in communication with the memory 360. Although the data 362 and instructions 364 are shown as residing in the same memory 360, it should be understood that a separate memory may be used.

Memory 360 stores information accessible by processor 368, including instructions 364 that may be executed by the processor 368. Similar to the memory 230 of the host 120, the memory 360 may be of any type capable of storing information accessible by the processor, such as a hard-drive, memory card, ROM, RAM, DVD, CD-ROM, write-capable, and read-only memories. The memory 360 includes data 362 that may be retrieved, manipulated or stored by the processor in accordance with the instructions 364. For instance, although the system and method is not limited by any particular data structure, the data may be stored in computer registers, in a relational database as a table having a plurality of different fields and records, or XML documents. The data may also be formatted in any computer-readable format such as, but not limited to, binary values, ASCII or Unicode. Moreover, the data may comprise any information sufficient to identify the relevant information, such as numbers, descriptive text, proprietary codes, pointers, references to data stored in other memories (including other network locations) or information that is used by a function to calculate the relevant data.

The instructions 364 may be any set of instructions to be executed directly (such as machine code) or indirectly (such as scripts) by the processor. In that regard, the terms "instructions," "steps" and "programs" may be used interchangeably herein. The instructions may be stored in object code format for direct processing by the processor, or in any other computer language including scripts or collections of independent source code modules that are interpreted on demand or compiled in advance.

The instructions 364 may be executed by the processor, for example, to identify bits to be transferred to the host 120, determine a required modification, indicate the modification, and send the bits to be transferred.

The processor 368 may be a state machine or any conventional processor, such as processors from Intel Corporation or Advanced Micro Devices. Alternatively, the processor 368 may be a dedicated device such as an ASIC. Although FIG. 3 functionally illustrates the processor 368 and memory 360 as being within the same block, it will be understood that the processor and memory may actually comprise multiple processors and memories that may or may not be stored within the same physical housing. For example, some of the instructions and data may be stored on removable CD-ROM and others within a read-only computer chip. Some or all of the instructions and data may be stored in a location physically remote from, yet still accessible by, the processor 368. Similarly, the processor 368 may actually comprise a collection of processors which may or may not operate in parallel.

Figure 4:
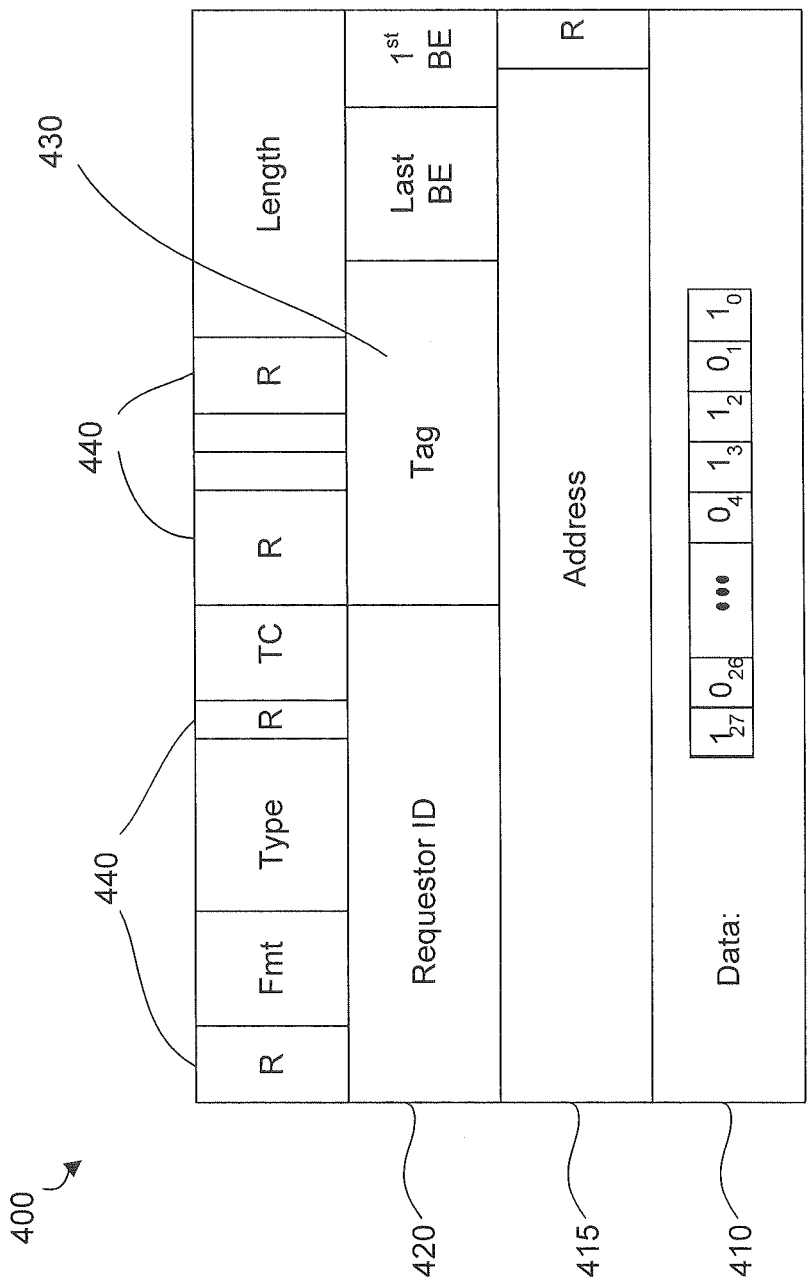
FIG. 4 is a block diagram of an example packet according to aspects of the disclosure.

According to some examples, the indication provided by the peripheral device 150 to the host 120 may be included in a transaction layer packet (TLP) header of the transmitted data. FIG. 4 illustrates an example TLP 400.

The TLP 400 may include a number of different fields, where the fields are designated for different types of information. For example, data field 410 may include the bytes to be transferred to the host 120. Address field 415 may include a destination address for the TLP 400, such as an address of the host 120. Requestor ID field 420 may include information identifying the sender of the TLP, such as an address of the peripheral device 150. Tag field 430 may include steering tags for delivering the TLP 400. Reserved fields 440 may be kept empty unless a specialized need for such fields arises.

According to one example, tag field 430 may include the indication of how the bytes in data field 410 should be modified by the CPU 120. For example, if the peripheral device 150 is not sending a full cacheline of 64 or 128 bits, it may set particular flags in the tag field 430 indicating that padding is required. As another example, if the peripheral device 150 is sending a full cacheline of 64 or 128 bits, but the bits are offset, the tag field may 430 may include an indication of the needed modification. In some examples, the peripheral device 150 may even indicate to the CPU 120 an amount of padding or offset needed. As another example, the tag field 430 may indicate which bits inside the cacheline can be overwritten.

In addition to or in the alternative to using the tag field 430, the peripheral device 150 may use one or more of the reserved fields 440 for indicating information about the transferred bits to the host 120. Further, according to some examples, the manner in which information is indicated to the host 120 may vary depending on traffic class or security protocols in place. For example, transfers to a trusted device may be handled differently than transfers to other devices. A device may be trusted, for example, if it appears on a designated whitelist, or if it passes a predetermined security protocol.

While the above examples describe using packet header information to indicate a required modification for each transfer sent between the peripheral device and the host, any communication mechanism agreed upon by the host and the peripheral may be used. For example, the peripheral may indicate the required modification in a separate transmission or using a different format.

Example Methods

Figure 5:
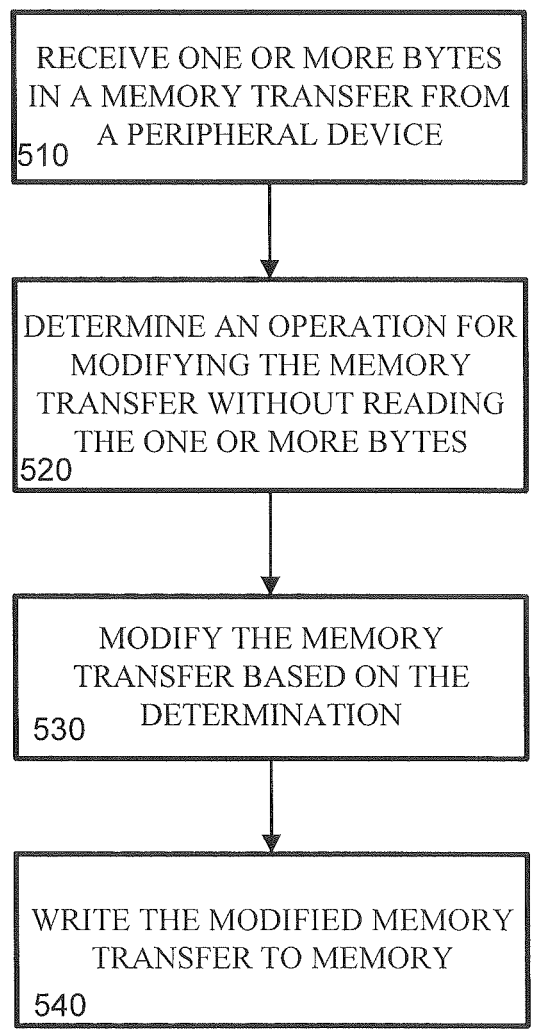
FIG. 5 is a flow diagram of an example method according to aspects of the disclosure.

FIG. 5 provides an example flow diagram illustrating a method 500 for efficient memory transfers. The method 500 may be performed by, for example, a host CPU or other device capable of receiving memory transfers. It should be understood that the operations involved in the below method need not be performed in the precise order described. Rather, various operations may be handled in a different order or simultaneously, and operations may be added or omitted.

In block 510, one or more bytes in a memory transfer are received from a peripheral device. The bytes may include a full cacheline of 64 or 128 bytes. However, in other instances the bytes may only include a partial cacheline. The bytes may be sent as part of a DMA transfer, and may be included in packet with additional information in the header.

In block 520, an operation for modifying the memory transfer is determined without reading the one or more bytes. For example, the determination may be based on information in the packet header of the transfer. For example, the header may include flags which indicate to the host that the transferred bytes need to be padded. In some instances, the flags may also indicate the amount of padding required. Alternatively or additionally, the amount of padding may be determined using internal logic of the host device. The determination may be made for each transfer that is received. Therefore, rather than continually applying the same operation as transfers are received, the operations may vary on a per-transfer basis. For some transfer, it may be determined that no modifications are needed.

In block 530, the memory transfer is modified based on the determination. The modification may include padding the bytes, overwriting particular bytes, or any other operation.

In block 540, the modified cacheline is written to memory. As a result of the modification, the cacheline should be complete and properly aligned with other data in the memory.

The foregoing techniques are advantageous in that they provide for conserving both bandwidth and host processing power. Because the modification is performed at the host side, additional bytes of padding do not need to be send between the peripheral device and the host. Moreover, because the modification is performed without requiring a read operation, host processing power is conserved. Moreover, because the determination is performed on a per-transfer basis, the modifications can be tailored to each transfer.

As these and other variations and combinations of the features discussed above can be utilized without departing from the subject matter as defined by the claims, the foregoing description of exemplary aspects should be taken by way of illustration rather than by way of limitation of the subject matter as defined by the claims. It will also be understood that the provision of the examples described herein (as well as clauses phrased as "such as," "e.g.", "including" and the like) should not be interpreted as limiting the claimed subject matter to the specific examples; rather, the examples are intended to illustrate only some of many possible aspects.

The invention claimed is:

1. A method of processing memory transfers, comprising:
receiving, at a host device, one or more bytes in a memory transfer from a peripheral device;
determining, by the host device, prior to a write attempt and without reading the one or more bytes, an operation for modifying the received memory transfer;
modifying, by the host device prior to writing to memory, the memory transfer based on the determination to ensure cacheline size and alignment; and
writing, by the host device, the modified memory transfer to memory.

2. The method of claim 1, wherein modifying the memory transfer comprises adjusting a number of bytes in the memory transfer.

3. The method of claim 2, wherein adjusting the number of bytes in the memory transfer comprises padding the one or more bytes with additional bytes.

4. The method of claim 2, further comprising:
accessing, by the host device, internal logic; and
determining, based on the internal logic, a number of the additional bytes for padding the one or more bytes of the memory transfer.

5. The method of claim 1, wherein the memory transfer is a direct memory access (DMA) transfer.

6. The method of claim 1, determining the operation for modifying the memory transfer is based on information in the memory transfer.

7. The method of claim 6, wherein the information in the memory transfer is a flag set in a transaction layer packet header accompanying the one or more bytes.

8. A system for processing memory transfers, comprising:
at least one memory for storing received data, the memory being subdivided into cachelines of a predetermined length;
one or more processors in communication with the memory, the one or more processors programmed to:
receive one or more bytes in a memory transfer from a peripheral device;
determine, prior to a write attempt and without reading the one or more bytes, an operation for modifying the memory transfer;
modify the memory transfer, prior to writing to memory, based on the determination to ensure cacheline size and alignment; and
write the modified memory transfer to the at least one memory.

9. The system of claim 8, wherein modifying the memory transfer comprises adjusting a number of bytes in the memory transfer.

10. The system of claim 9, wherein adjusting the number of bytes in the memory transfer comprises padding the one or more bytes with additional bytes.

11. The system of claim 9, wherein the one or more processors are further programmed to:
access internal logic; and
determine, based on the internal logic, a number of the additional bytes for padding the one or more bytes of the memory transfer.

12. The system of claim 8, wherein the memory transfer is a direct memory access (DMA) transfer.

13. The system of claim 8, determining the operation for modifying the memory transfer is based on information in the memory transfer.

14. The system of claim 13, wherein the information in the memory transfer is a flag set in a transaction layer packet header accompanying the one or more bytes.

15. A system for facilitating memory transfers, comprising:
one or more processors;

at least one memory in communication with the one or more processors, the at least one memory storing instructions executable by the one or more processors to:
  identify bits to transfer to another computing device;
  determine, based on the identified bits, a modification required by the another computing device;
  indicate the determined modification to the another computing device while transferring the identified bits to the another computing device.

16. The system of claim 15, wherein indicating the determined modification comprises setting one or more bits in a header accompanying the identified bits.

17. The system of claim 15, wherein the determined modification is a padding of the identified bits.

18. The system of claim 15, wherein the indication is adapted to be understood by the another computing device without requiring the another computing device to perform a read of the identified bits.

* * * * *